(12) United States Patent
Ulucan

(10) Patent No.: US 9,163,676 B2
(45) Date of Patent: Oct. 20, 2015

(54) FRICTION CLUTCH

(71) Applicant: LICOS Trucktec GmbH, Markdorf (DE)

(72) Inventor: Lütfü Ulucan, Deggenhausertal (DE)

(73) Assignee: Licos Trucktec GmbH, Markdorf (DE)

( * ) Notice: Subject to any disclaimer, the term of this patent is extended or adjusted under 35 U.S.C. 154(b) by 21 days.

(21) Appl. No.: 13/888,487

(22) Filed: May 7, 2013

(65) Prior Publication Data

US 2013/0306428 A1 Nov. 21, 2013

(30) Foreign Application Priority Data

May 15, 2012 (DE) .......................... 10 2012 009 589

(51) Int. Cl.
| | |
|---|---|
| *F16D 27/01* | (2006.01) |
| *F16D 27/00* | (2006.01) |
| *F16D 27/112* | (2006.01) |

(52) U.S. Cl.
CPC .............. *F16D 27/004* (2013.01); *F16D 27/01* (2013.01); *F16D 27/112* (2013.01)

(58) Field of Classification Search
CPC ....... F16D 27/004; F16D 27/01; F16D 27/12; F16D 27/14; F16D 27/112; F16D 2027/007; F16D 2027/008
See application file for complete search history.

(56) References Cited

U.S. PATENT DOCUMENTS

| | | | |
|---|---|---|---|
| 2003/0196863 A1* | 10/2003 | Faller et al. ................... | 192/48.3 |
| 2010/0263981 A1 | 10/2010 | Krafft et al. | |
| 2011/0067779 A1* | 3/2011 | Gray ................................. | 141/7 |
| 2012/0049684 A1* | 3/2012 | Bodenstein et al. ..... | 310/156.12 |

FOREIGN PATENT DOCUMENTS

| | | |
|---|---|---|
| DE | 101 58 732 A1 | 6/2003 |
| EP | 2 241 777 A2 | 10/2010 |
| EP | 2 299 085 A1 | 3/2011 |

OTHER PUBLICATIONS

European Search Report mailed Jul. 8, 2013.

* cited by examiner

*Primary Examiner* — Huan Le
(74) *Attorney, Agent, or Firm* — Burr & Brown, PLLC

(57) ABSTRACT

A friction disk clutch with an electromagnet arrangement which has a coil former and a ferromagnetically conductive coil support, which supports the coil former and at least partially surrounds the latter, and, adjacent to the coil support, there are permanent magnet means, by means of which an axially movable friction section of the friction disk clutch can be connected magnetically to the rotor, and the permanent magnet means are arranged on the rotor in such a way that the permanent magnet means are covered by essentially no magnetically conductive section of the rotor on a side which is transverse to the direction of magnetization thereof. Anchoring means for mounting the permanent magnet means on the rotor include a mounting section formed for this purpose on the rotor, by means of which the permanent magnet means are mounted in the correct position on the rotor.

12 Claims, 3 Drawing Sheets

FRICTION CLUTCH

This application claims the benefit under 35 USC §119(a)-(d) of German Application No. 10 2012 009 589.9 filed May 15, 2012, the entirety of which is incorporated herein by reference.

FIELD OF THE INVENTION

This invention relates to a friction clutch.

BACKGROUND OF THE INVENTION

Friction clutches for transmitting torques between a drivable rotor and an element to be driven by the rotor are known, allowing parts that are to be coupled to one another, such as disk-type clutch components, to be selectively separated or connected, in particular, by nonpositive engagement.

Friction clutches of this kind can be designed as magnetic clutches, which comprise an electromagnet arrangement having a coil former or wire coil, which can be connected to an electric voltage source and energized, and a coil support composed of magnetically conductive material.

These also include arrangements which additionally have permanent magnets, by means of the magnetic action of which, when the electromagnet is not exerting a magnetic effect, a movable clutch element is attracted to a mating section, counter to a spring force or the like, for example, and these components are connected nonpositively for torque transmission. By energizing the electromagnet, it is then possible, by means of the magnetic field produced, to attenuate or cancel out the effect of the permanent magnet to such an extent that the friction clutch disengages, with the movable clutch element leaving the position of nonpositive engagement.

These clutches are used in vehicles, for example.

The disadvantage with the arrangements described is the comparatively high outlay involved in the manufacture of such clutches and the components thereof.

SUMMARY OF THE INVENTION

It is the object of the present invention to improve friction clutches of the type stated at the outset technically and in respect of economical manufacture.

The present invention starts from a friction clutch for torque transmission from a rotor that can be driven about an axis to an element to be driven, comprising a friction disk clutch with an electromagnet arrangement which has a coil former and a ferromagnetically conductive coil support, which supports the coil former and at least partially surrounds the latter, and, adjacent to the coil support, there are permanent magnet means, by means of which an axially movable friction section of the friction disk clutch can be connected magnetically to the rotor, and the permanent magnet means are arranged on the rotor in such a way that the permanent magnet means are covered by essentially no magnetically conductive section of the rotor on a side which is transverse to the direction of magnetization thereof. The element to be driven preferably rotates about the same axis about which the rotor can be rotated.

The essential aspect of the present invention consists in that there are anchoring means for mounting the permanent magnet means on the rotor, comprising a mounting section formed for this purpose on the rotor, by means of which the permanent magnet means are mounted in the correct position on the rotor. In particular, the permanent magnet means can be anchored rigidly on the rotor by means of the anchoring means. The permanent magnet means can thus advantageously be mounted on the rotor in a simple and easily assembled manner. It is furthermore advantageous that a main body of the rotor is formed by or manufactured integrally with a component. In particular, the permanent magnet means are annular, being a single part, for example, or being formed by a plurality of parts which correspond to sections of a ring shape, e.g. by a plurality of ring segments in the form of ring sections. If there is a plurality of permanent magnet elements on the rotor, these are preferably of the same design as one another.

In particular, the permanent magnet means can be mounted on the inside of an already existing section of the rotor, e.g. a web region extending in the axial direction. The web region or that side thereof which is fitted with the permanent magnet means is spaced apart here from the electromagnet arrangement and, in particular, the coil support by means of an air gap.

Covering of the permanent magnet means as hitherto, e.g. in the manner of a sandwich structure, which is expensive, can be avoided since fastening the permanent magnet means with the anchoring means provides sufficiently high retaining forces.

The magnetic field lines of the permanent magnet means mounted in a fixed manner on the rotor run perpendicular to main sides of the relevant permanent magnets or the surfaces of the main sides are at least approximately perpendicular to the direction of magnetization of the permanent magnet means, for example. The permanent magnet means can be formed, for example, by a plurality of segment-like permanent magnets or by a continuous, uninterrupted ring composed of a permanent magnet material.

One advantageous possibility is for the permanent magnet means to be present at different points or in different orientations on the rotor. It must merely be ensured that a suitable magnetic flux can form in each case between the rotor and the element to be driven. It is advantageous if the main sides of the permanent magnet means are oriented in such a way that the normals thereof are oriented in the axial or the radial direction relative to the axis of rotation of the rotor.

In particular, the permanent magnet means can be fixed on the rotor by means of the anchoring means in such a way that just one main side or main surface of the permanent magnet means rests on the rotor, with the other, opposite main side of the permanent magnet means remaining free or adjoining the air gap and thus advantageously being adjacent to the coil support of the electromagnet arrangement.

Accordingly, a flat coil side of the ferromagnetic coil support likewise adjoins the air gap, the coil side preferably being oriented parallel and opposite to the free main side of the permanent magnet means. This arrangement is advantageous overall for the desired formation of the magnetic field lines.

It is advantageous if the anchoring means comprise an offset, against which a stop surface, matched to the offset, of the permanent magnet means rests when the permanent magnet means are mounted in the correct position on the rotor. In the mounted state of the permanent magnet means on the rotor, the offset, by means of adjacent offset surface regions on the rotor that converge with one another at right angles for example, and the stop surface of the permanent magnet means, e.g. a narrow side or end of the permanent magnet means, come into mutual surface contact. In this case, the offset forms a mechanical stop for the permanent magnet means, with the result that the permanent magnet means rest thereon and are secured against movement on the rotor in at least one spatial direction. If the permanent magnet means are mounted by means of a holding element, the holding element can rest with one side against the offset and hence be fixed in position in the relevant direction.

It is furthermore advantageous that the anchoring means have a contact region set back on one side of the rotor. In this case, the contact region provides a contact surface, for example, which can be a bottom surface of a recess that serves as a fixed contact side or boundary for the permanent magnet means inserted or a holding element.

In this case, the offset can be present on the rotor so as to encircle the recess, the recess being used for the accommodation or at least partially recessed insertion of the permanent magnet means on the rotor. The recess can, for example, have a bottom surface of basically rectangular shape which is flat or arched in the form of a hollow cylinder and forms the contact surface, the shape and size or a bottom side of the permanent magnet means being designed accordingly to match the shape and size or bottom surface of the recess and hence being capable of being inserted in a well-fitting manner into the recess. The permanent magnet means can be accommodated in the recess so as to be flush or to protrude, for example. In the case of a rectangular recess, the offset, which forms four edge sections of the recess which are at right angles to one another and surrounds the recess, provides a mechanical stop for the permanent magnet means in four different spatial directions.

It is furthermore proposed, in an advantageous variant of the present invention, that a holding element is provided, on which the permanent magnet means are present, wherein the holding element can be attached releasably, in particular snapped in or latched, to the rotor in order to attach the permanent magnet means. This simplifies the installation of the permanent magnet means.

It is also advantageous that the holding element comprises an annular main body which is mounted releasably on the rotor.

In particular, the holding element is matched to the shape of the rotor or of a section thereof, being, in particular, annular or hollow-cylindrical or in the form of at least a section of the shape. It is advantageous if the permanent magnet means are shaped in a corresponding manner, that is to say, for example, are annular or in the form of a ring segment and are mounted on the holding element.

It is also advantageous that an adhesive joint is formed for the purpose of mounting the permanent magnet means on the rotor. This is, in particular, a simple possibility for installation. In this case, the permanent magnet means can be bonded directly to the rotor or to the holding element, which may itself likewise be attached to the rotor by adhesive bonding and, if required, additionally secured by further elements.

It is advantageous if a retaining ring that can be inserted in a groove on the rotor is provided to fix the permanent magnet means on the rotor with respect to at least one direction in the mounted state. In particular, the permanent magnet means are thereby secured on the rotor in an axial direction with respect to an axis of rotation of the rotor. A retaining ring is a reliable and proven retaining element for rotating components. The retaining ring can be a snap ring, for example. It is also possible for the holding element to be secured on the rotor by means of a retaining ring.

Another advantageous embodiment of the present invention is distinguished by the fact that the permanent magnet means are arranged in a volume of a hollow cylinder. This is advantageous functionally and in terms of construction. It is advantageous if the permanent magnet means are present radially on the inside of an outer part of the rotor, on the outside of which, for example, a belt support of a belt pulley is formed if the rotor is configured as a belt or poly-V belt pulley.

It is furthermore advantageous that the permanent magnet means are arranged in a volume of a tubular section. The tubular section is part of the rotor or the holding element, for example. It is advantageous if a rotor main body of the rotor, i.e. without the holding element and the permanent magnet means, is formed by a single component or integrally. The rotor can comprise a tubular element, or the rotor main body can be produced from such, if required by connection to further rotor elements.

According to an advantageous embodiment of the present invention, the permanent magnet means are designed in such a way that the connection of the friction section to the rotor can be canceled in an electrically operated state of the electromagnet arrangement by weakening the magnetic effect of the permanent magnet means. Thus, a "fail-safe clutch" can be obtained, wherein reliable frictional connection of the friction clutch is always achieved in a de-energized state by means of the permanent magnet means. It is thereby possible to avoid critical situations attributable to failure of the power supply by virtue of the friction clutch, which would otherwise not be operated. If the operated friction clutch is necessary, for example, to maintain a cooling system, e.g. that of an internal combustion drive that drives the rotor, cooling is advantageously maintained, even if the electric power supply to the electromagnet arrangement fails.

It is furthermore advantageous that the permanent magnet means are sintered or injection-molded.

This is advantageous in respect of production and/or of the properties of the permanent magnet means.

Finally, it is advantageous that the permanent magnet means are designed as ring segments. In particular, a plurality of similar ring segments are arranged on the rotor at uniform spacings from one another and circumferentially around the axis of rotation of the rotor.

BRIEF DESCRIPTION OF THE DRAWINGS

Further advantages and features of the invention are explained in greater detail by means of the illustrative embodiments according to the present invention shown in schematic form in the figures.

DETAILED DESCRIPTION OF THE INVENTION

In some cases, the same reference signs are used in the figures for corresponding elements of different illustrative embodiments.

Figure 1:
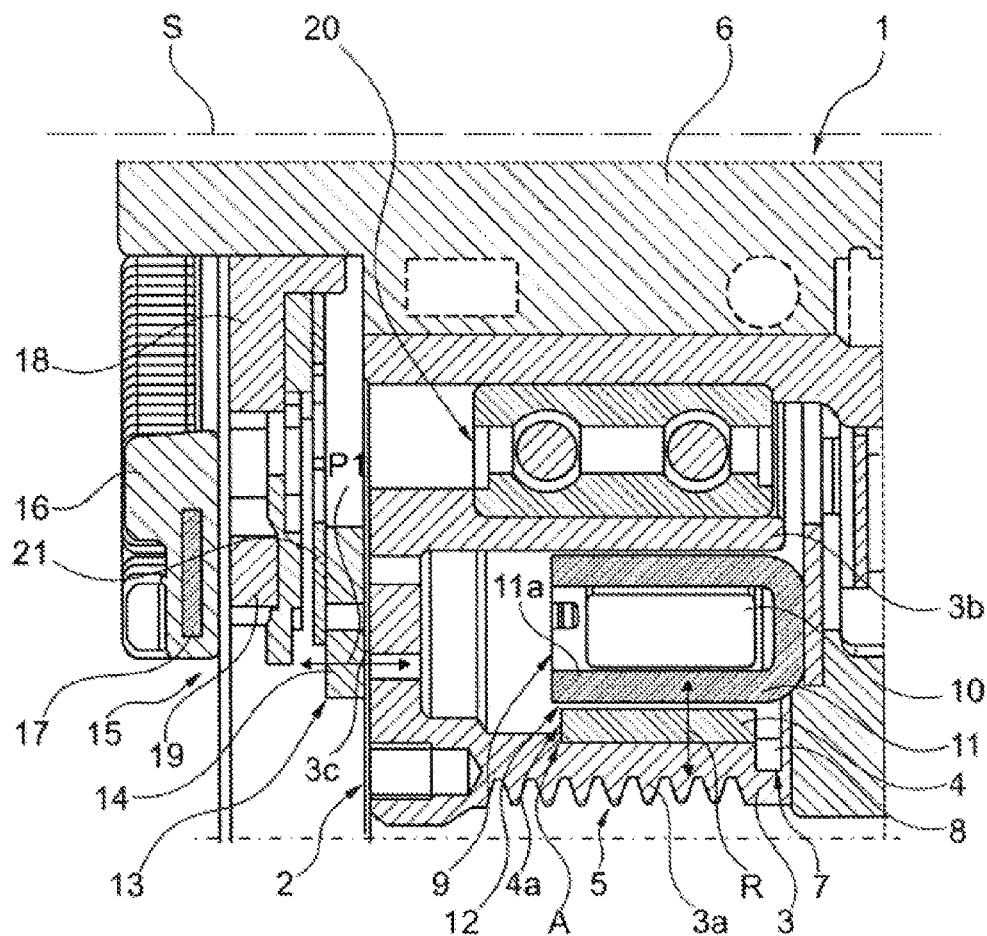
FIG. 1 shows a friction clutch according to the invention in a partial view and in section.

FIG. 1 shows, in section, an arrangement, e.g. for a vehicle powered by internal combustion and having a friction clutch 1 according to the invention, which is designed as a "fail-safe clutch". The friction clutch 1 according to the invention, which is shown in FIG. 1 and which is configured for torque transmission from a rotor 2 that can be driven about an axis S to an element to be driven, has permanent magnet means on a section of the rotor 2, wherein the permanent magnet means corotate with the rotor 2.

For this purpose, the friction clutch 1 has, on the rotor 2, a belt pulley 3 with permanent magnet means constructed from a permanent magnet ring 4 of permanently magnetic material. It is advantageous if the permanent magnet ring 4 is situated radially on the inside or on a bottom side, opposite a belt support 5 of the belt pulley 3.

In order to avoid unwanted thermal stresses due to parts heating up during operation in the region of the permanent magnet ring 4, in particular due to a flow of electric current through current-carrying parts, the permanent magnet ring 4 can be provided in a form that is divided at one point on the circumference or as an open ring with, for example, just one slot.

For the same reason, the permanent magnet means in an advantageous embodiment of the friction clutch 1 can be formed not by the permanent magnet ring 4 but by a plurality of ring segments, which are situated on a circumferential line and are positioned spaced apart circumferentially or positioned concentrically with respect to the axis of rotation S of the shaft 6. The fundamental point for the formation of the desired permanent-magnetic effect of the permanent magnet means is that the direction of magnetization should be the same or is permanently maintained in all the ring segments or segments of the permanent magnet means. This arrangement should be distinguished, in particular, from systems for the formation of eddy currents and, in particular, has nothing to do with an eddy current system, for example.

By means of an offset A running around the circumference, which is part of the anchoring means and is formed on a radially inner side of a radially outer web 3a of radially spaced webs 3a, 3b of the belt pulley 3, a stop for an end 4a of the permanent magnet ring 4 is provided in a correctly positioned mounted state. It is thereby advantageously ensured that, in the mounted state of the permanent magnet ring 4, which is mounted on web 3a by means of a radially outer longitudinal side, is fixed in position axially in one direction relative to a belt pulley base 3c connecting webs 3a and 3b. At its axially opposite end or at the free end of web 3a, the permanent magnet ring 4 is furthermore secured against displacement during the rotary operation of the belt pulley 3 by means of a prestressed retaining ring 8 inserted removably in a matching encircling groove 7 in web 3a.

Webs 3a and 3b delimit a recess in the form of an annular channel into which an electromagnet arrangement 9 of the friction clutch 1 projects. The electromagnet arrangement 9, which is fixed in position, has a coil 10 and a coil support 11, which is U-shaped in axial section and surrounds the coil 10 on three sides.

It is advantageous if a radially inner longitudinal side of the permanent magnet ring 4 is spaced apart from a radially outer web 11a of the coil support 11 by means of a small air gap 12. The longitudinal sides of the permanent magnet ring 4 are transverse to the direction of magnetization R of the permanent magnet ring 4.

The friction clutch 1 according to FIG. 1 furthermore comprises a friction disk clutch 13 with an armature disk 14, which can be moved axially in accordance with permanent-magnetic or electromagnetic forces, as described below.

The rotor 2 can be driven in rotation about the axis S.

It is advantageous if the permanent magnet ring 4 extends over somewhat more than the axial extent of the coil 10 in the axial direction with respect to the axis S and the shaft 6. It is also advantageous that the permanent magnet ring 4 is present and formed in the magnetic flux in such a way that, when the coil 10 is not energized, the armature disk 14 is drawn into frictional engagement with a mating section of the rotor 2 or with the belt pulley base 3c, with torque transmission taking place between the rotor 2 and the armature disk 14 and hence torque transmission taking place from the rotor 2 to the shaft 6, which represents the element to be driven.

The arrangement from FIG. 1 furthermore has an eddy current arrangement 15 in the region of a fan impeller 16 seated on the shaft 6, with an encircling metal ring 17 being formed in the fan impeller 16 or being enclosed by the material of the fan impeller 16, for example. A plurality of individual permanent magnets 19, of alternating polarity, of the eddy current arrangement 15 are present on a flange ring 18 connected to the shaft 6, in a position axially opposite the region of the ring 17. The individual permanent magnets 19 have nothing to do with the permanent magnet ring 4.

Moreover, there is a rolling contact element bearing 20, by means of which the rotor 2 is supported rotatably relative to the shaft 6. Here, the rolling contact element bearing 20 is designed as a two-row rolling contact ball bearing. In this case, it is advantageous that the rolling contact element bearing 20 extends axially over the entire axial extent of that part of the belt pulley 3 which is designed as a belt support 5.

By means of the electromagnet arrangement 9, it is possible to act upon the friction disk clutch 13, the friction disk clutch 13 serving to transmit torque from the rotor 2 to the shaft 6 in the operated state of the friction clutch. The friction disk clutch 13 comprises the friction disk, which is connected rigidly to the shaft 6, is configured as a ferromagnetic armature disk 14 and can be moved in the direction indicated by the double arrow P1, axially with respect to the shaft 6 and parallel to the axis of rotation S. For this purpose, the armature disk 14 is mounted by means of a resiliently deflectable spring disk 21 made, for example, from spring steel, the spring disk 21 being connected rigidly to the flange ring 18 in a position radially on the inside.

The friction disk clutch 13 with the armature disk 14 is designed in such a way that, in practice, the armature disk 14 in each case occupies one of two different operating positions. In a first operating position (not shown), the armature disk 14 is drawn against a mating end section or the belt pulley base 3c of the ferromagnetically conductive rotor 2 by the magnetic forces produced by the permanent magnet means in accordance with the permanent magnet ring 4, with the result that the two components 14 and 3c interact nonpositively or frictionally and are connected to one another for conjoint rotation. To form a desired magnetic field line profile, the armature disk 14 and the belt pulley base 3c are provided with mutually offset openings or gaps in the material.

If torque transmission to the shaft 6 is to be canceled while the rotor 2 is rotating, the coil 10 of the electromagnet arrangement 9 is energized, producing a magnetic field which counteracts the magnetic field of the permanent magnet ring 4 in such a way that a resultant or possibly almost completely eliminated magnetic field is so weak or negligible that the spring force of the spring disk 21 acting on the armature disk 14 ensures that the armature disk 14 is moved away from the belt pulley base 3c. As a result, the shaft 6 is no longer driven in rotation directly by the rotor 2 (see FIG. 1).

Figure 2:
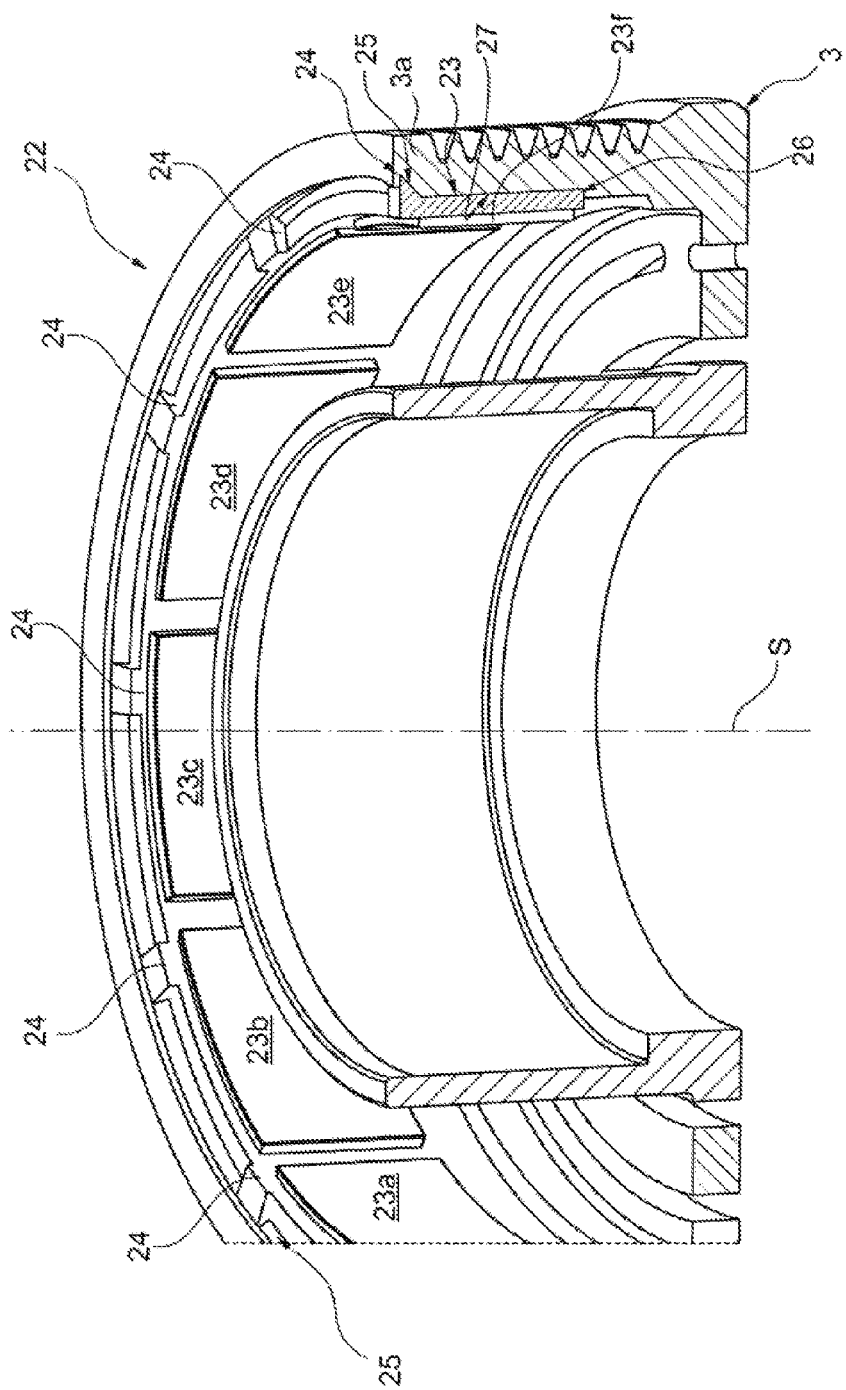
FIG. 2 shows a rotor of an alternative friction clutch according to the invention in perspective and in section.

FIG. 2 shows a sectional perspective view of a rotor 22 of an alternative friction clutch according to the present invention. The basic construction of the rotor 22 is comparable to that of the rotor 2 shown in FIG. 1 and, accordingly, has a belt pulley 3 with an outer web 3a, on which the permanent magnet means are present radially on the inside in the form of a plurality of permanent magnet elements arranged circumferentially with respect to the axis of rotation S, permanent magnet elements 23a to 23f of the elements being visible in FIG. 2. Permanent magnet elements 23a to 23f are mounted rigidly on an annular holding element 23, which is part of the anchoring means. Permanent magnet elements 23a to 23f, which are rectangular in plan view, are bent slightly to match the hollow-cylindrical shape of the holding element 23.

The holding element 23 is manufactured from plastic and is formed with a plurality of projecting latching tabs 24 capable of slight elastic deflection, which are present on one edge of the holding element 23 in a manner uniformly spaced apart around the circumference. The latching tabs 24 are triangular in section and project from a side of the holding element 23 which lies opposite the side having permanent magnet elements 23a to 23f.

To enable the holding element 23 together with the permanent magnet elements to be mounted detachably on the rotor 22, by hand or without tools for example, the latching tabs 24 engage in a continuous encircling groove 25 radially on the inside of web 3a, the groove being designed to match the latching tabs 24. The holding element 23 can thus be snapped into the rotor 22, for example, by the latching tabs 24 being pressed into the groove 25 and latching in there, thus ensuring that the holding element 23 with the permanent magnet elements is mounted in a manner fixed or secured on the rotor 22, this being shown by FIG. 2.

In this case, a further tubular section of the holding element 23 comes into surface contact with a contact region 27 on the inside of web 3a, the contact region being formed in a recessed or set-back manner. The contact region 27 is bounded by an offset 26 on web 3a. The contact region 27 formed on the hollow-cylindrical wall of web 3a, together with the offset 26, is present circumferentially all around the axis of rotation S.

Permanent magnet elements 23a to 23f can be adhesively bonded or firmly fixed in some other way to the holding element 23, for example. By means of the holding element 23, which is fitted with permanent magnet elements 23a to 23f and further permanent magnet elements that are not shown, it is advantageously possible to fix the permanent magnet means on the rotor 22 and to remove them again, if appropriate.

Figure 3:
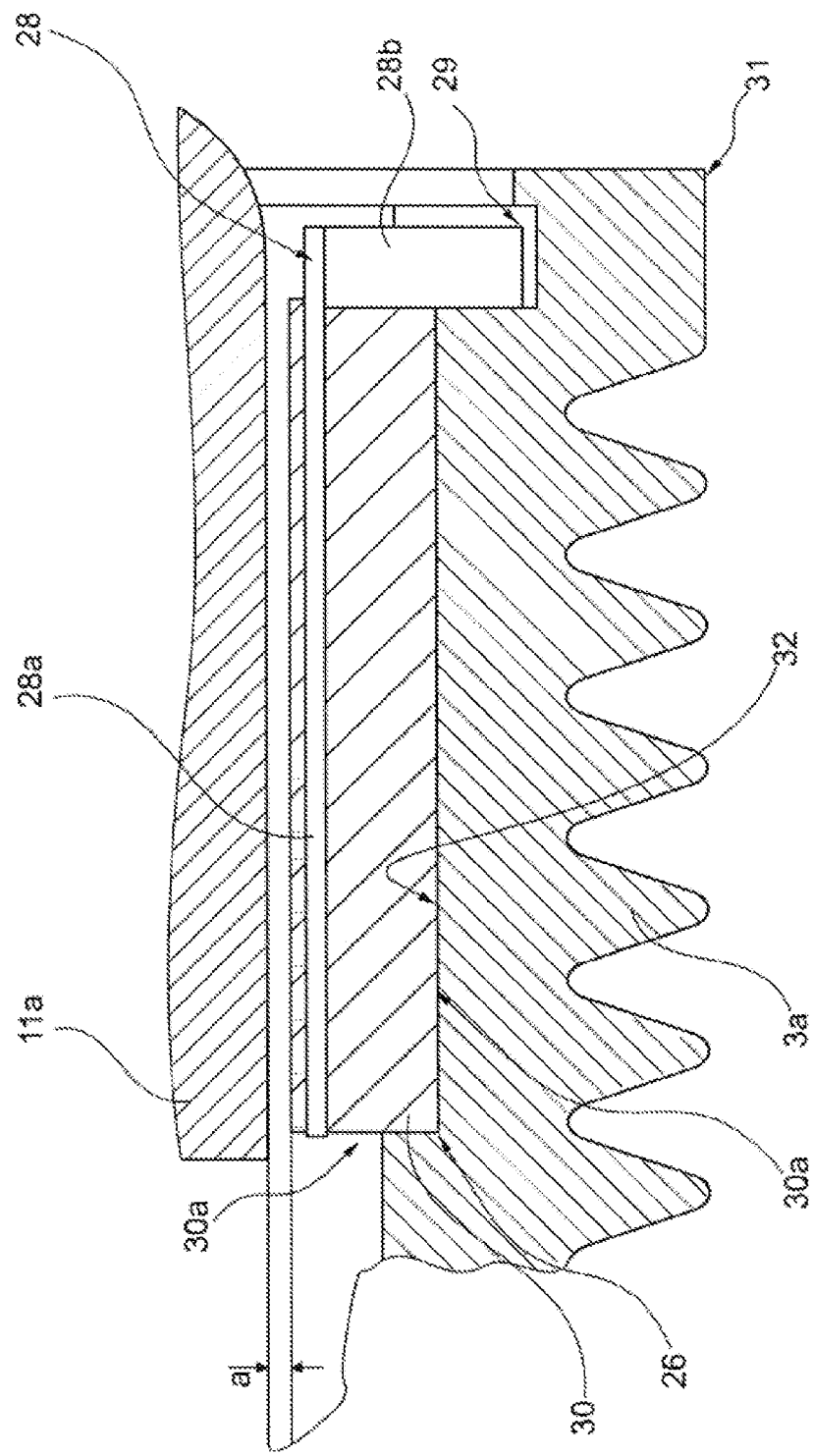
FIG. 3 shows an enlarged detail of part of another, alternative friction clutch according to the invention in a sectional view.

FIG. 3 shows an alternative anchoring means to that in FIG. 1 for mounting a permanent magnet element 30 on the inside of a web 3a of a rotor 31, a section of which is shown. Instead of the retaining ring 8 shown in FIG. 1, a holding element designed as a plastic strip 28 is provided to anchor the permanent magnet element 30. Also shown is a section of a web 11a of a coil support of an electromagnet arrangement, wherein the web 11a is spaced apart from the inside of the permanent magnet element 30 by means of an air gap, with the spacing a. The permanent magnet element 30 is mounted rigidly on the plastic strip 28. The plastic strip 28 is L-shaped in section and has a sleeve section 28a, on which the permanent magnet element 30 is mounted, and a ring 28b, which projects at right angles with respect to the sleeve section 28a and is rectangular in section. In the illustrated removably mounted state of the plastic strip 28 on the rotor 31, the ring 28b engages in a self-locking manner in a groove 29 formed for this purpose on web 3a.

Moreover, like the holding element 23 shown in FIG. 2, on web 3a, the permanent magnet element 30, which projects on both sides of the plastic strip 28, is inserted so as to be held resting flat against web 3a, radially on the inside, in the region of a set-back region with an offset 26. Here, one end 30a of the permanent magnet element 30 rests against a vertical section of the offset 26. The decisive holding effect is accomplished with the ring 28 snapped or pressed into the groove 29 and latched there, this being indicated only in a highly schematized or greatly simplified manner in FIG. 3. A bottom side 30a of the permanent magnet element 30 furthermore rests flat against a contact region 32 set back from a radially inner side of web 3a of the rotor 31.

In addition to snapping in or as an alternative, the plastic strip 28 with the permanent magnet element 30 can also be bonded adhesively to the rotor 31 or web 3a.

LIST OF REFERENCE SIGNS 1 friction clutch
2 rotor
3 belt pulley
3a web
3b web
3c belt pulley base
4 permanent magnet ring
4a end
5 belt support
6 shaft
7 groove
8 retaining ring
9 electromagnet arrangement
10 coil
11 coil support
11a web
12 air gap
13 friction disk clutch
14 armature disk
15 eddy current arrangement
16 fan impeller
17 ring
18 flange ring
19 individual permanent magnet
20 rolling contact element bearing
21 spring disk
22 rotor
23 holding element
23a permanent magnet element
23b permanent magnet element
23c permanent magnet element
23d permanent magnet element
23e permanent magnet element
23f permanent magnet element
24 latching tab
25 groove
26 offset
27 contact region
28 plastic strip
28a sleeve section
28b ring
29 groove
30 permanent magnet element
30a bottom side
30a end
31 rotor
32 contact region

The invention claimed is:

1. A friction clutch for torque transmission from a rotor that can be driven about an axis to an element to be driven, comprising a friction disk clutch with an electromagnet arrangement having a coil former and a ferromagnetically conductive coil support, which supports and at least partially surrounds the coil former, and, adjacent to the coil support, there is a permanent magnet, which is configured to connect an axially movable friction section of the friction disk clutch magnetically to the rotor, and the permanent magnet is arranged on the rotor in such a way that the permanent magnet is covered by essentially no magnetically conductive section of the rotor on a side which is transverse to the direction of magnetization thereof, wherein there is an anchoring web for mounting the permanent magnet on the rotor, comprising a mounting section formed on the rotor, by which the permanent magnet is mounted in a correct position on the rotor.

2. The friction clutch according to claim 1, wherein the anchoring web comprises an offset, against which a stop surface, matched to the offset, of the permanent magnet rests when the permanent magnet is mounted in the correct position on the rotor.

3. The friction clutch according to claim 1, wherein the anchoring web has a contact region set back on one side of the rotor.

4. The friction clutch according to claim 1, wherein a holding element is provided, on which the permanent magnet is present, wherein the holding element can be attached releasably, in particular snapped in, to the rotor in order to attach the permanent magnet.

5. The friction clutch according to claim 4, wherein the holding element comprises an annular main body which is mounted releasably on the rotor.

6. The friction clutch according to claim 1, wherein an adhesive joint is formed for the purpose of mounting the permanent magnet on the rotor.

7. The friction clutch according to claim 1, wherein a retaining ring that can be inserted in a groove on the rotor is provided to fix the permanent magnet on the rotor with respect to at least one direction in the mounted state.

8. The friction clutch according to claim 1, wherein the permanent magnet is arranged in a volume of a hollow cylinder.

9. The friction clutch according to claim 1, wherein the permanent magnet is arranged in a volume of a tubular section.

10. The friction clutch according to claim 1, wherein the permanent magnet is designed in such a way that the connection of the friction section to the rotor can be canceled in an electrically operated state of the electromagnet arrangement by weakening the magnetic effect of the permanent magnet.

11. The friction clutch according to claim 1, wherein the permanent magnet is sintered or injection-molded.

12. The friction clutch according to claim 1, wherein the permanent magnet is designed as ring segments.

* * * * *